March 17, 1970     A. STINGELE     3,501,580
MICRO-FURNACE FOR USE IN MICROSCOPE HOT-STAGE
Filed Feb. 19, 1968
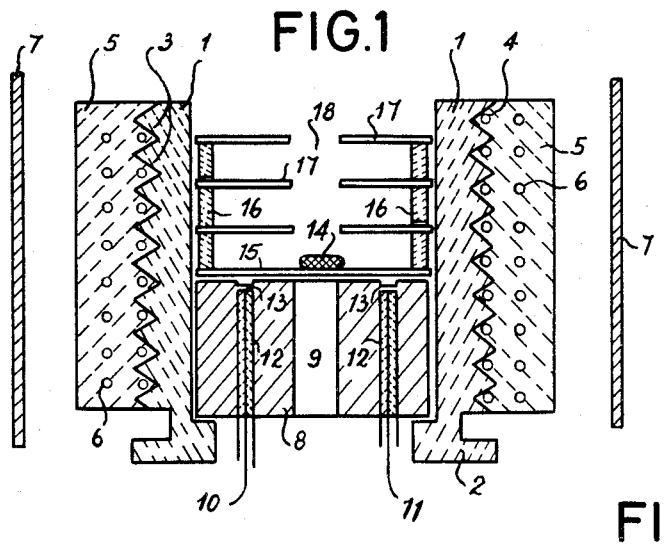
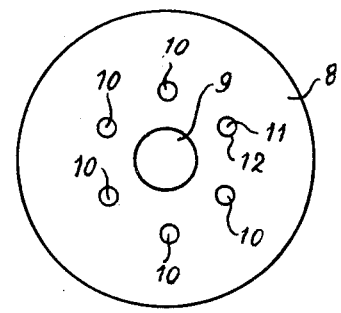
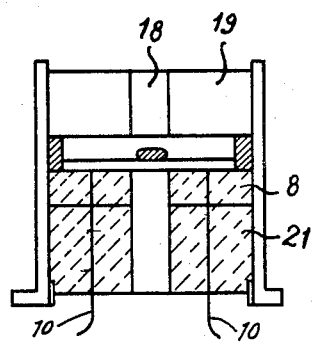
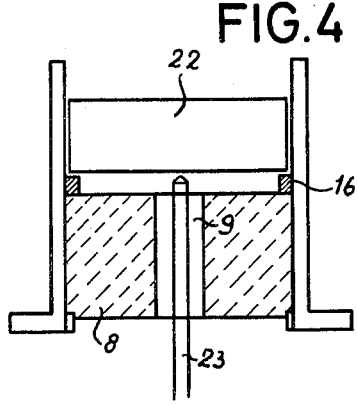
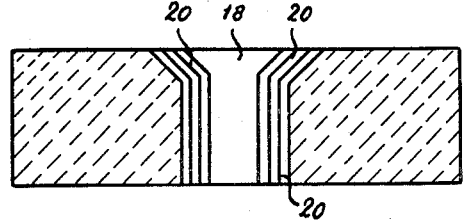
INVENTOR.
Dr. ALWIG STINGELE United States Patent Office 3,501,580
Patented Mar. 17, 1970

3,501,580
MICRO-FURNACE FOR USE IN A
MICROSCOPE HOT-STAGE
Alwig Stingele, Alkmaar, Netherlands, assignors to European Atomic Energy Community (Euratom), Brussels, Belgium
Filed Feb. 19, 1968, Ser. No. 706,449
Claims priority, application Germany, Mar. 13, 1967,
E 33,585
Int. Cl. H05b 3/62; G01n 25/00
U.S. Cl. 13—20                                6 Claims

ABSTRACT OF THE DISCLOSURE

A microfurnace for use in a microscope hot stage permitting a high thermal precision and an open observation channel. In order to reduce the temperature gradient due to the channel the tubular furnace has above the specimen holder and mutually spaced from each other several radiation plates. The remaining temperature gardient is taken into account by measuring the sample holder surface temperature with a multileg thermocouple, the legs of which are welded to that surface in spaced distribution.

---

The invention relates to a micro-furnace for microscope hot-stages for use in precision measurements at high temperatures (e.g. up to 1500° C.). Microscope hot-stages are today used increasingly in solving physico-chemical problems, in particular problems relating to metallography.

Generally only qualitative and informative results are obtained in this manner, as stable temperature conditions and the reproduceability of the measurements are only of secondary importance.

However, if it should be necessary to apply high temperature microscopy to the quantitative evaluation of problems, for which purpose is needed highly sensitive precision equipment which is suitable for many different applications, no equipment has been found on the market which reliably meets these requirements. It is desirable that it should be possible in the case of the hot-stage for the temperature gradient within the specimen to be known and to be maintained as low as possible, for the temperature variation to be less than 0.1° C. and for the temperature to be reproducible accurately.

These requirements may have to be met, for example, in connection with the following problems:

The precision measurement of melting points up to 1500° C.;

The solubility of oxides in fused salts;

The relationship between melting point and particle size; and the deduction from this of the interfacial tension in the solid-liquid boundary layer;

The solubility of gases in fused salts.

Different arrangements of a heating element, thermoelement and specimen are known in the prior art.

There are no data which correlate systematically temperatures measured by thermoelement with true temperatures; likewise there are no data on radial and vertical temperature gradients within the specimen and on temperature constancy during the period of observation.

In its broad aspect, the present invention provides a micro-furnace for use in a microscope hot-stage, comprising an upright tubular furnace body of ceramic material around which is placed a heating coil, a coating on the body of ceramic material which is or becomes hard at elevated temperatures and in which the coil is embedded, a specimen holder of platinum or platinised material within the body and having an observation channel co-axial with the body, and a plurality of thermo-couples at the upper face of the specimen holder around the observation channel.

More specifically a micro-furnace for precision microscope hot-stages for use at temperatures up to 1500° C. comprises, according to the invention, essentially a crucible furnace of ceramic material, which is provided with a heating coil, preferably of a Pt-Rh alloy, which is embedded in a coating composition that is completely hardened at elevated temperatures (e.g. over 1000° C.) and, if desired, a second heating coil may additionally be embedded in this coating composition. The micro-furnace components are made of platinum or a platinised material, and through the specimen holder, which is provided with a central observation channel, there are passed several Pt-Rh thermoelement wires and a Pt thermoelement wire, which are electrically insulated and which are preferably arranged in a concentric manner about the central observation channel, being intimately welded with the surface of the specimen holder, the welding positions being ground flat and preferably recessed to a depth of 0.1–0.2 mm., but not deeper. Above the specimen holder are placed, on ceramic spacing rings, removable radiation plates or a massive radiation block of platinum or a platinised material, which are provided with a central observation channel, and the micro-furnace is surrounded by a radiation plate, preferably of stainless steel. A platinum micro-crucible with a Pt/Pt/Rh thermoelement welded in its base, which can be placed on the above-mentioned ceramic spacing rings, may also be provided.

The observation channel in the above-mentioned radiation block preferably has an adjustable aperture.

Some specific embodiments of the invention will now be described with the aid of the accompanying drawings in which:

FIGURE 1 is a longitudinal section of a crucible furnace with built-in radiation plates;

FIGURE 2 is a plan of the specimen holder;

FIGURE 3 is a longitudinal section of a crucible furnace with a built-in radiation block;

FIGURE 4 is a cross section of a micro-furnace embodying a micro-crucible, and

FIGURE 5 is a cross-section of a radiation block with an adjustable aperture in the observation channel.

In FIGURE 1 a conventional tubular micro-furnace 1 of ceramic material having a foot 2. It is provided on its outer side with a helical ridge 3 in which is arranged a heating coil 4 made of 1.8 mm. platinum-rhodium wire. A ceramic $Al_2O_3$ coating composition 5 which is fully hardened at temperatures of 1200° C. is applied to the micro-furnace ceramic material for accurate positioning of the heating coil 4. By accurately fixing the heating coil 4 it is possible to obtain a non-varying, linear relationship between the filament voltage applied and the effective filament wattage acting on the specimen. An additional heating coil 6 also made of 1.8 mm. Pt/Rh wire is preferably embedded in the coating material 5 and arranged in series with the first heating coil 4 and thus—by doubling the filament resistance—the temperature range of the installation can be extended, because in this manner the specific current density of the heating coil at a given temperature can be reduced. The micro-furnace is surrounded by a radiation shield 7 made of Inox-steel. The ceramic components described have a height of about 10 mm. and an internal diameter of about 8 mm. A specimen holder 8 of solid Pt, with a central observation channel 9 for transmitted light microscopy (illumination from below) is placed in the micro-furnace. Through the specimen holder 8 are passed five Pt/Rh thermoelement wires 10 and a Pt thermoelement wire 11 which are electrically insulated at 12 and which are intimately welded 13 with the specimen holder 8 by means of Pt solder, in such a manner that all the welding positions 13 are placed at regular intervals concentrically about an observation channel 9 (see also FIGURE 2). The welding positions 13 are recessed to a depth of 0.1–0.2 mm., so as to protect them against chemical attack at the very high temperature. The different welding positions are linked with each other electrically across the surface of the specimen holder 8, which makes it possible to measure directly the individual temperatures, the average temperatures and the temperature differences between the different measuring points and thus the radial temperature gradient in the plan of the specimen holder 8 can be evaluated. The measurement is carried out by placing the specimen 14 on a specimen plate 15 on the specimen holder 8. The specimen plate can be a sapphire plate or a metal, graphite or sintered alumina plate. Circular radiation plates 17 are placed on ceramic spacing rings 16 and are provided with central observation channels for incidental light microscopy and transmitted light microscopy. The radiation plates reduce heat losses and prevent the buildup of a high vertical heat gradient. With this arrangement it is possible to arrive at a sensible compromise solution with regard to the desired position, the temperature of observation and the size of the available field of vision. The smaller the opening, the more closely conditions approximate to black body conditions.

In another embodiment of the invention, as shown in FIGURE 3, there is used in place of the radiation plates 17 a radiation block 19 made of Pt, which likewise has a central observation channel 18, whose aperture can be adjusted by interfitting components 20 (FIGURE 5) so that by repeating the tests with apertures of different size, it is possible, in a very convenient manner, to extrapolate the results to black body conditions. The specimen holder 8 shown in FIGURE 3 is, furthermore, thinner and is placed on a ceramic base 21.

In the embodiment of the invention shown in FIGURE 4 the micro-furnace can be used for micro-differential thermal analysis. For this purpose a micro-crucible 22 made of platinum, which can be placed on the spacing ring 16 (FIGURE 4), is introduced into the micro-furnace, a Pt/Pt/Rh thermoelement being welded centrally on the underside of this micro-crucible to provide a contact position, the wire of this thermoelement being led off through the observation channel 9 of the specimen holder 8. Due to the ceramic spacing ring 16 (FIGURE 4) a definite heat resistance builds up between the base of the crucible and the surface of the specimen holder, which results in the case of an exothermic or endothermic reaction in a recognizable temperature gradient.

In general, the vertical temperature gradient brought about by the use of a specimen holder plate can be measured, by first placing a suitable substance directly on the polished and chemically inert surface of the specimen holder or on the underside of the specimen holder plate, and then causing the substance to melt on the surface of a specimen holder plate, and comparing the melting points. The temperature difference gives the vertical gradient as a direct function of the thickness of the layer of the specimen holder plate.

According to a commercially advantageous embodiment of the invention, the various components of the micro-furnace can be supplied assembled by mechanical assembly technique. With the micro-furnace according to the invention it is possible to achieve precision, to reproduce measurements with an accuracy and to have a multiplicity of applications which were unattainable to date.

To illustrate this a few data are given:

Temperature range—20–1500° C.

Temperature stability during one hour—0.10–0.02° C.

Temperature stability during 10 hours—0.2° C.

Temperature program that can be adopted with negligible deviation from linearity—0.02° C./min.–50° C./min. (obtained by the linear variation of the filament voltage with time).

Temperature gradients—(up to 1200° C.)—0.2° C., radial in the specimen holder; 0.1° C., vertical in the sapphire plate.

Measurements can be carried out under a reduced pressure of $10^{-2}$ mm. Hg and under excess pressure up to 1 atmosphere, which is particularly advantageous in gas analysis.

Measurements can also be carried out under a greatly reduced pressure at $10^{-5}$ mm. Hg (with the same micro-furnace assembly in the high vacuum chamber).

The apparatus according to the invention, described above, can be used with great advantage in all physico-chemical laboratories, in solid-state physics laboratories and in metallurgical and ceramic laboratories.

I claim:

1. A microfurnace for use in a microscope hot stage comprising an upright elongated hollow furnace body of ceramic material, a heating coil around said body, a platinum or platinized specimen holder transversely positioned inside said hollow body, a plurality of radiation plates transversely positioned inside said hollow body and axially spaced from each other and from said specimen holder, an axially extending observation channel formed by aligned apertures in said specimen holder and said radiation plates, and a multileg thermocouple having a plurality of platinum-rhodium wires and one platinum wire welded to the surface of said specimen holder in regular positions around the observation channel.

2. Micro-furnace as claimed in claim 1 in which the welding points on the holder surface are recessed to a depth of 0.1–0.2 mm.

3. Micro-furnace as claimed in claim 1 in which several removable plates of platinum or platinised material are stacked above the specimen holder with ceramic spacing rings between the plates.

4. Micro-furnace as claimed in claim 3 in which at least one of the plates has an adjustable aperture composed of several concentric rings the inner rings being separately removable.

5. A micro-furnace as claimed in claim 1 wherein said furnace body is tubular and said radiation plates are annular.

6. A micro-furnace as claimed in claim 1 wherein said thermocouple wires are introduced from beneath and insulated from said specimen holder except for welding at the surface thereof.

References Cited

UNITED STATES PATENTS

| | | | |
|---|---|---|---|
| 2,661,385 | 12/1953 | Lincoln et al. | 13—20 |
| 3,303,689 | 2/1967 | Paulik et al. | 73—15 |

H. B. GILSON, Primary Examiner

U.S. Cl. X.R.

73—15